(12) United States Patent
Sirigu et al.

(10) Patent No.: US 11,163,090 B2
(45) Date of Patent: Nov. 2, 2021

(54) PHOTOELECTRIC SENSOR WITH COAXIAL EMISSION AND RECEIVING OPTICAL PATHS

(71) Applicant: Datalogic IP Tech S.r.l., Calderara di Reno (IT)

(72) Inventors: Gianluca Sirigu, Selargius (IT);
Andrea Di Chele, Campobasso (IT);
Giacomo Rigoni, Bologna (IT)

(73) Assignee: Datalogic IP Tech S.R.L., Calderara di Reno (IT)

( * ) Notice: Subject to any disclaimer, the term of this patent is extended or adjusted under 35 U.S.C. 154(b) by 154 days.

(21) Appl. No.: 16/451,456

(22) Filed: Jun. 25, 2019

(65) Prior Publication Data
US 2020/0408948 A1 Dec. 31, 2020

(51) Int. Cl.
*G01V 8/14* (2006.01)
(52) U.S. Cl.
CPC .................................. *G01V 8/14* (2013.01)
(58) Field of Classification Search
CPC ..................... G01V 8/14; G01S 7/4812
See application file for complete search history.

(56) References Cited

U.S. PATENT DOCUMENTS

| 4,346,292 | A | * | 8/1982 | Routt, Jr. | ........... | G06K 7/10762 |
| | | | | | | 235/462.32 |
| 6,084,998 | A | * | 7/2000 | Straayer | ............. | G02B 6/02138 |
| | | | | | | 359/572 |
| 6,114,712 | A | * | 9/2000 | Dvorkis | ............. | G06K 7/10594 |
| | | | | | | 235/472.01 |
| 2004/0113054 | A1 | | 6/2004 | Majima et al. | | |
| 2008/0180667 | A1 | | 7/2008 | Okuno | | |
| 2012/0262700 | A1 | | 10/2012 | Schumann et al. | | |
| 2019/0120960 | A1 | * | 4/2019 | Koga | ..................... | G01S 7/4873 |

FOREIGN PATENT DOCUMENTS

| DE | 20 2012 010 432 U1 | 11/2012 |
| JP | 2005164261 A | 6/2005 |
| JP | 5266859 B2 | 8/2013 |
| WO | 2006016504 A1 | 2/2006 |

OTHER PUBLICATIONS

Co-pending European Pat. Appl. No. 20182464.2, Extended European Search Report dated Nov. 23, 2020, 8 pgs.

* cited by examiner

*Primary Examiner* — Thanh Luu
(74) *Attorney, Agent, or Firm* — Foley & Lardner LLP

(57) ABSTRACT

A coaxial photoelectric sensor may include both an optical emitter and optical receiver disposed on a printed circuit board. A total internal reflection optical component may be optically aligned with the optical emitter so as to reflect an illumination signal generated by the emitter. A reflective optical component may be optically aligned with the total internal reflection optical component so as reflect the illumination signal received from the total internal reflection optical component. A target reflector component may be optically aligned with the reflective optical component to coaxially reflect the illumination signal received from the reflective optical component. An optical detector may be configured to generate an electrical signal in response to receiving the illumination signal.

20 Claims, 11 Drawing Sheets

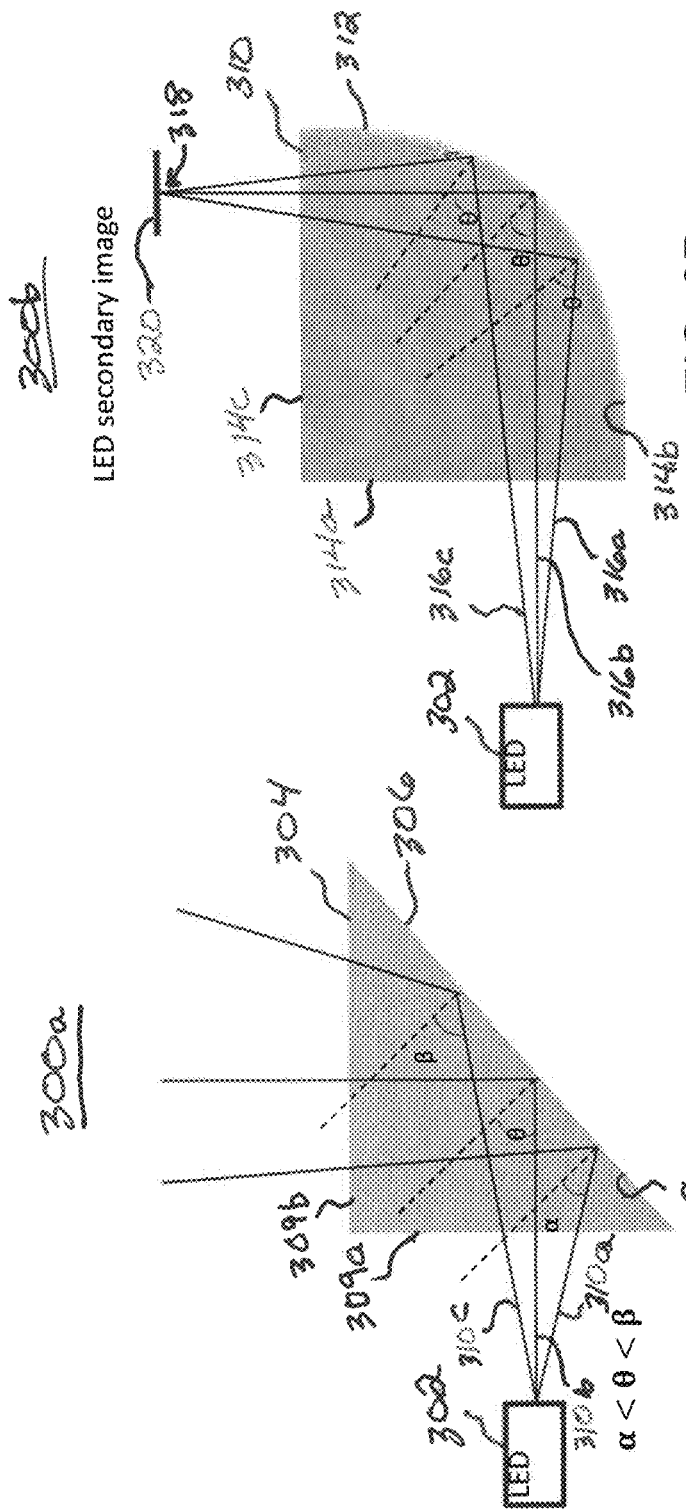

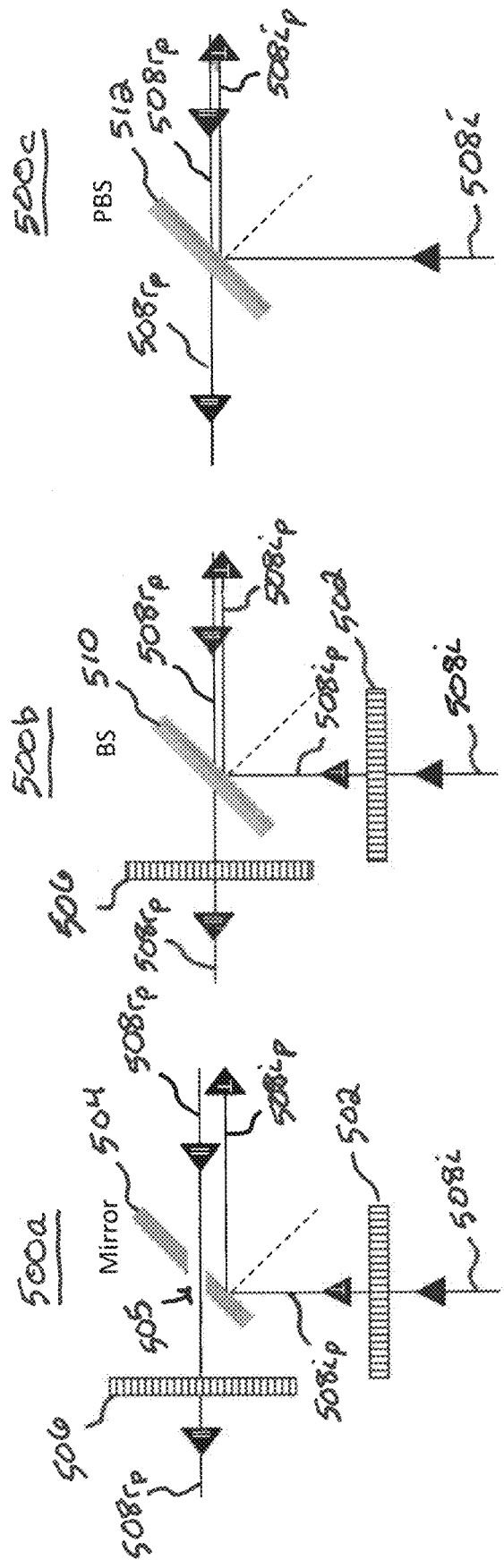

PHOTOELECTRIC SENSOR WITH COAXIAL EMISSION AND RECEIVING OPTICAL PATHS

BACKGROUND

Photoelectric sensors are devices with an emitter that can be a light emitting diode (LED) or a laser, and receiver that can be a photodiode, a position sensitive device, an avalanche photodiode or a photodiode array. Photoelectric sensors are widely used in broad range of applications spanning from logistics to pharmaceuticals. In this context, photoelectric sensors can have different optical designs according to market requirements. For example, photoelectric sensors can have different working ranges, different spot sizes, or different switching frequencies depending on application needs. Among various optical designs, two primary categories of photoelectric sensors exist: biaxial and coaxial photoelectric sensors.

The biaxial photoelectric sensor has two different optical axes that belong to the two photoelements (i.e., the emitter and the receiver). Each photoelement has a lens that converges, diverges, or collimates an illumination signal or light beam according to design requirements. Biaxial photoelectric sensors cover the majority of a photocell family and have many mechanical parts in common within each other. In general, a designer may take advantage of design similarity to reduce cost and to design common production cycles. As a consequence, biaxial photoelectric sensors generally have inexpensive manufacturability. In other cases, biaxial photoelectric sensors are used for background suppression sensors that measure distance of objects, thereby exploiting triangulation principles.

Coaxial photoelectric sensors are devices characterized by a common axis of the emitter and receiver. Generally speaking, coaxial optics are difficult to miniaturize and have very specific optics designs that require specialized mechanical parts and assembly with respect to standard biaxial sensors. It is usually difficult to leverage on reuse of common parts/subassemblies and common assembly strategy due to the specialized mechanical parts and assembly, thus making coaxial sensors very specific within a product family, very resource demanding, and expensive to produce.

Conversely, coaxial photoelectric sensors will enable a large number of miniaturized photoelectric sensors that, for example, can measure target tilt. Despite the challenges with specialized design, however, biaxial photoelectric sensors can be manufactured with fewer mechanical components and need relatively small variations, thereby generally not affecting the modularity of a product family design.

Furthermore, coaxial photoelectric sensors have just one optical axis which exits from the sensor. Different internal optical designs of coaxial photoelectric sensors have heretofore been proposed. The most common optical configuration proposes the two photoelements with two different optical axes that are generally 90-degrees (or other angle) rotated relative to one another, but inside the sensor enclosure, the optical axes are combined by a reflecting optical element, such as a beam splitter. However, four main drawbacks of such a configuration exists. First, a large number of custom mechanical parts are needed. Second, the relative 90° positioning of the emitter and receiver requires separation of receiving and transmitting electronics in uncommon way, often requiring multiple PCBs or manual assembly components with consequently increased difficulties in production and alignment. Third, such multi-optical axes designs suffer from a loss of power and spot deformation due to a misalignment between a reflecting optical element and lenses along the optical path of the emitting and the receiving beam. Sometimes this drawback can be overcome introducing the fine adjustment of the position of the lenses. Fourth, the coaxial optical arrangements are typically very expensive with respect to biaxial optical arrangements.

BRIEF SUMMARY

To overcome the shortcomings of photoelectric sensors, a coaxial photoelectric sensor is designed, including a virtual source in an embodiment, which may be positioned at 90° with respect to a receiver axis and both photoelements may be positioned on the same PCB as are biaxial photoelectric sensor arrangements. This coaxial photoelectric sensor configuration is possible using an additional optical element that directs the illumination signal or light beam towards a main reflecting optical element (e.g., beam splitter) used to align both emitting (tx) and receiving (rx) illumination signals on the same axis. The additional optical element may be either a curved mirror or a lens that reflects the light beam by total internal reflection. The main optical element may be a beam splitter, a polarizing beam splitter, a polarizing bandpass filter, or a mirror with a hole to prevent blocking of the beams of both photoelements. Such a configuration may result in a cost effective solution due to limiting the number of optical components and manufacturing steps without sacrificing functionality of the photoelectric sensor.

One embodiment of a coaxial photoelectric sensor may include an optical emitter disposed on a printed circuit board (PCB), and configured to generate an illumination signal. A total internal reflection optical component may be optically aligned with the optical emitter so as to receive and reflect the illumination signal to generate a first reflected illumination signal. A reflective optical component may be optically aligned with the reflection optical component so as to reflect the first reflected illumination signal received from the reflection optical component to produce a second reflected illumination signal. A target reflector component may be optically aligned with the reflective optical component to coaxially reflect the second reflected illumination signal received from the reflective optical component. The target reflector component may be an optical component that is part of the optical sensor or an object that is being sensed. An optical detector may be disposed on the PCB, and be configured to generate an electrical signal in response to receiving the illumination signal coaxially reflected by the target reflector component.

One embodiment of a process of coaxially photoelectrically sensing may include generating an illumination signal. The illumination signal may be first reflected to produce a first reflected illumination signal. The first reflected illumination signal may thereafter be second reflected to produce a second reflected illumination signal. The second reflected illumination signal may be coaxially reflected. An electrical signal may be generated in response to receiving the coaxially reflected illumination signal.

One embodiment of a method of manufacturing a coaxial photoelectric sensor may include disposing an optical emitter on a printed circuit board (PCB), the optical emitter being configured to generate an illumination signal. A reflection optical component may be optically aligned with the optical emitter to receive and reflect the illumination signal to produce a first reflected illumination signal. A reflective optical component may be optically aligned with the reflection optical component so as to receive the illumination signal received from the reflection optical component to produce a second reflected illumination signal. A target reflector component may be optically aligned with the reflective optical component to coaxially reflect the second reflected illumination signal received from the reflective optical component. An optical detector may be disposed on the PCB to generate an electrical signal in response to receiving the illumination signal coaxially reflected by the target reflector component.

BRIEF DESCRIPTION OF THE DRAWINGS

Illustrative embodiments of the present invention are described in detail below with reference to the attached drawing figures, which are incorporated by reference herein and wherein:

FIG. 3A is an illustration of an unsuitable portion of an optical configuration for use in an optical sensor;

FIG. 3B is an illustration of an optical configuration that includes a total internal reflection (TIR) optical component or curved light guide similar to or identical to the TIR optical component of FIGS. 2A and 2B;

FIGS. 5A-5C are illustrations of alternative configurations of optical components of a coaxial photoelectric sensor;

DETAILED DESCRIPTION OF THE DRAWINGS

Figure 1:
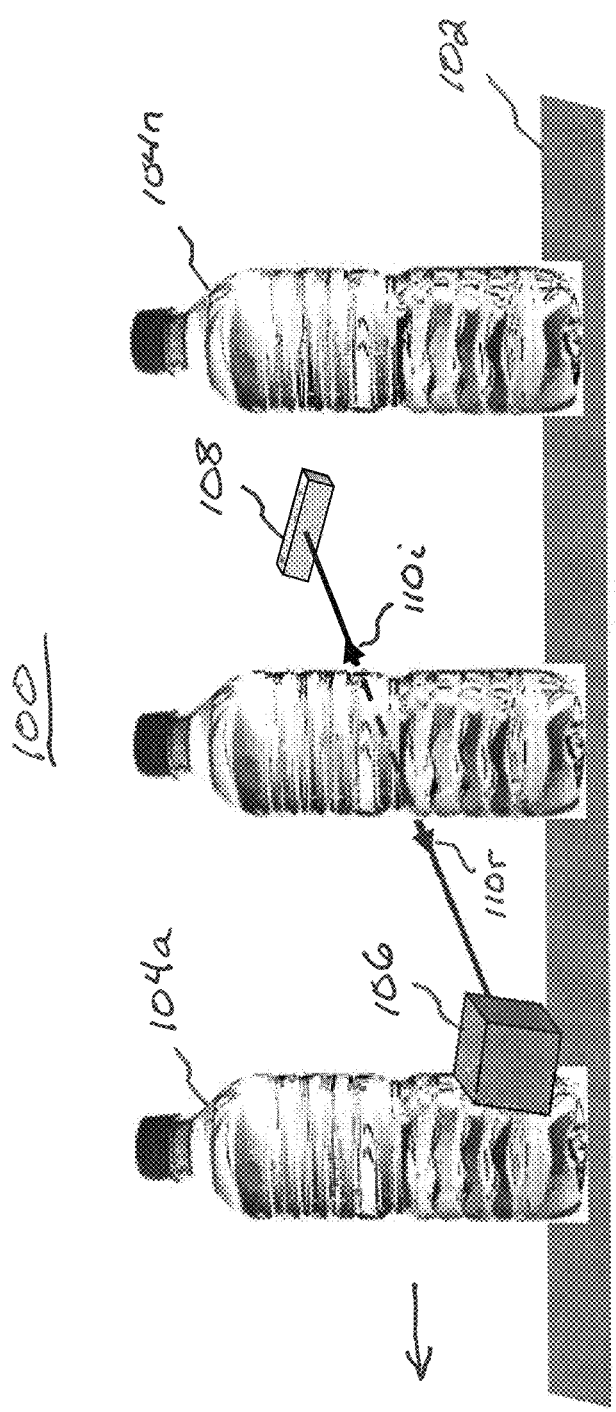
FIG. 1 is an illustration of an illustrative logistics environment in which a conveyer belt operates to move objects, in this case water bottles that are sensed by a coaxial photoelectric sensor.

With regard to FIG. 1, an illustration of an illustrative logistics environment 100 in which a conveyer belt 102 operates to move objects 104a-104n (collectively 104), in this case water bottles, that are sensed by a coaxial photoelectric sensor is shown. A photoelectric sensor or optical sensor 106 may be optically aligned with a target reflector component 108 such that an incident illumination signal 110i generated by the optical sensor 106 may be coaxially reflected back to the optical sensor 106 as a reflected illumination signal 110r. The target reflector component 108 may be an optical component that is part of the optical sensor or an object (e.g., water bottle) that is being sensed or inspected, for example. That is, the object may coaxially reflect the incident illumination signal 110i as opposed to enabling the incident illumination signal 110i to pass therethrough if the object is opaque, reflective, or has other non-transparent properties. It should be understood that the target reflector component 108 may be an optical component, but transition to an object in the event that the object moves in front of the optical component until the object move past the sensor 106 at which time the target reflector component 108 transitions back to the optical component.

By coaxially reflecting the illumination signal 110i, a clear, translucent, and/or transparent object, such as a water bottle, may be detected, especially if the incident illumination signal 110i is polarized, as further described herein. Objects that are not clear, translucent, or transparent may, of course, be detected using the optical sensor 106 and target reflector component 108 configuration. Although a logistics environment 100 is shown, it should be understood that there are many other environments, such as a manufacturing inspection system, in which the photoelectric sensor 106 may be utilized to inspect and/or sense objects. Coaxial sensors are fundamental in applications where the two optical paths (emitter and receiver) should coincide, for example, in applications where the sensor should be aligned with holes or small apertures or when the target should be able to work at really close distances.

Figure 2A:
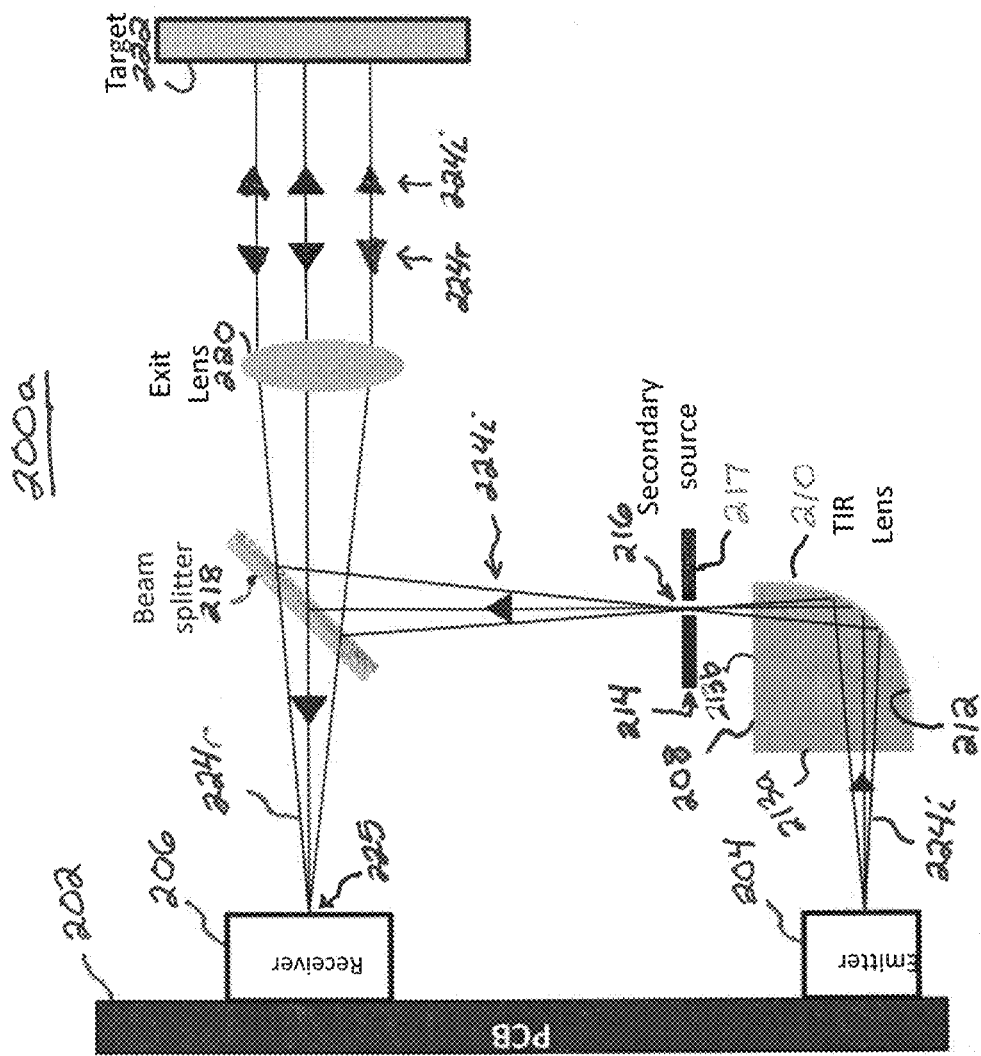
FIG. 2A is an illustration of an illustrative coaxial photoelectric sensor.

With regard to FIG. 2A, an illustration of an illustrative coaxial photoelectric sensor 200a is shown. The sensor 200a may include a printed circuit board (PCB) 202 that includes an optical emitter 204 and an optical sensor or receiver 206. By mounting the optical emitter 204 and optical sensor 206 to the same side of the same PCB 202, the optical emitter 204 and optical receiver 206 are coplanar and additional hardware and manufacturing processes to install the hardware and align an emitter and receiver are eliminated, thereby reducing cost and complexity of the sensor 200a. The optical emitter 204 may be a photodiode (e.g., LED) or laser, for example.

A total internal reflection (TIR) optical component or lens 208 may be optically aligned with the optical emitter 204. The TIR optical component 208 may be a lens that includes a curved profile 210 with a second surface or internal curved surface 212 that reflects incident light beams received via a first surface or incident sidewall 213a and exits via a third surface or exit sidewall 213b. In an embodiment, the TIR optical component 208 may be configured with a focal plane 214 at which a focal point 216 is formed, thereby operating as a virtual source (i.e., a spot in space from which illumination signals appear to irradiate). That is, the virtual source at the focal point 216 has substantially the same optical performance of a light source placed on a plane at 90 degrees compared to the optical emitter 204. In being substantially the same, any optical losses due to reflection or otherwise would be lost as compared to the optical performance of the optical emitter 204.

As shown, the virtual source is perpendicular or 90° with respect to an axis of the receiver 206. In an embodiment, the focal plane 214 may include a structure 217 that serves as a diaphragm or opening (e.g., iris) within which the focal point 216 is formed. In an embodiment, the focal point 216 may be larger than the opening of the structure 217, thereby enabling shaping of the virtual light source. Additionally, the structure may operate to eliminate spurious illumination signals that might otherwise pass from the TIR optical component 208 directly or indirectly to the receiver 206.

A reflective optical component 218 may be optically aligned with the total internal reflection optical component 208. In an embodiment, the reflective optical component 218 may be a beam splitter that reflects an illumination signal at one angle and enables an illumination signal to pass through the beam splitter at a different angle. Alternatively, the reflective optical component 218 may be a polarizing beam splitter, a polarizing bandpass filter, or a mirror with a hole to prevent blocking the illumination signal of both photo-elements 204 and 206. The reflective optical component 218 may be any other optical component that performs the same or similar function of the reflective optical component 218, as further described herein.

In an embodiment, an exit lens 220 may be provided at an output port of the sensor 200a, and be configured to collimate an optical signal so as to be perpendicularly output from the sensor 200a. A target reflector component 222 may be optically aligned with the reflective optical component 218 so as to coaxially reflect an illumination signal received from the reflective optical component 218.

The optical detector 206 disposed on the PCB 202 may be configured to generate an electrical signal in response to receiving an illumination signal. The optical detector 206 may be a single detector element or include multiple detector elements (e.g., 1D array or 2D matrix). In an embodiment, the optical detector 206 may be photodiode, a position sensitive device, an avalanche photodiode, or a photodiode array. In an embodiment, the optical path from the exit lens 220 to the optical detector 206 has the same length or substantially the same length (i.e., within an optical tolerance to as to have the same performance as being the same length) as the optical path from the focal point 216 of the virtual source to the exit lens 220.

With respect to the TIR optical component 208, the design of the TIR optical component may be designed with a few different design features, including: (i) an incidence angle on the internal reflection surface 212, material of the TIR optical component 208, and wavelength of the optical emitter 204. According to Snell's law:

$$n_1(\lambda)\sin\theta = n_2(\lambda)\sin\alpha,$$

where $n_1$ and $n_2$ are the refraction indices of the medium in which lie the incident and the refracting beam respectively, $\theta$ is the incidence angle, $\alpha$ is the refracting angle, and $\lambda$ is the emitter wavelength.

In order to have total reflection $\alpha=90°$ and therefore from the previous equation, a critical angle $\theta^*$ may be found by:

$$\theta^*(\lambda) = \sin^{-1}\frac{n_2(\lambda)}{n_1(\lambda)}$$

For every incidence angle $\theta \geq \theta^*$, the total reflection condition is fulfilled.

The TIR optical component is made with a material $n_1(\lambda) > n_2(\lambda)$. In an embodiment, the second medium may be air ($n_2 = n_{air} \approx 1$), and therefore the TIR optical component 208 works whenever an incidence angle of an illumination signal output by the optical emitter 204 meets the following condition:

$$\theta(\lambda) \geq \sin^{-1}\frac{1}{n_{lens}(\lambda)}$$

where $n_{lens}$ is the refraction index of the TIR optical component 208. Therefore, the wavelength of the optical emitter 208 and the choice of the material of the TIR optical component 208 is utilized when designing the sensor 200a. For a low cost photoelectric sensor 200a, the TIR optical component 208 may be plastic (e.g., PMMA, polycarbonate or cycloolefin, such as Zeonex). Other materials may be utilized, as well. For example, if a red optical signal is used with the TIR optical component 208 having $n_{lens}$ ranges from 1.49 for PMMA to 1.58 for polycarbonate, the critical angle may be about 42.2° and about 39.2° for PMMA and polycarbonate, respectively. In being about 42.2° and about 39.2°, the incident angle on the curved surface 210 is to be wider than the critical angle for the material used to make the TIR optical component 208. Wider ranges of critical angles are also possible, such as 38°-46°. As an example, the internal curved surface 212 of the TIR optical component 208 may also operate properly with an incidence angle of 45°. As such, it is also possible that other incidence angles may be used, but that the other solutions may necessitate optical configurations that consume more space.

In operation, the optical emitter 204 may emit an incident illumination signal or light beam 224i into the TIR optical component 208 via the incident sidewall 213a then the beam 224i totally reflects from the internal curved surface 210 and exits via the exit sidewall 213b. The illumination signal 224i may be any wavelength produced by an optical emitter, and have a beamwidth that is totally internally reflected from the internal curved surface 210. As shown, the illumination signal 224i is focused to a focal point 216 at the focal plane 214, which effectively acts as a virtual source. The incident illumination signal 224i is shown to be reflected from the reflective optical component 218, which is collimated into parallel beams by the exit lens 220. The collimated incident illumination signal 224i reflects from the target reflector component 222 as a reflected illumination signal 224r. The reflected illumination signal 224r passes through the exit lens 220 and is focused to a focal point 225 on the optical receiver 206 via the reflective optical component 218. Because the distance between the focal point 216 of the virtual source to the exit lens 220 may be the same or substantially the same (e.g., within a few microns), the number of optical components and supporting hardware may be reduced as compared to a configuration in which the distances are not matched.

Figure 2B:
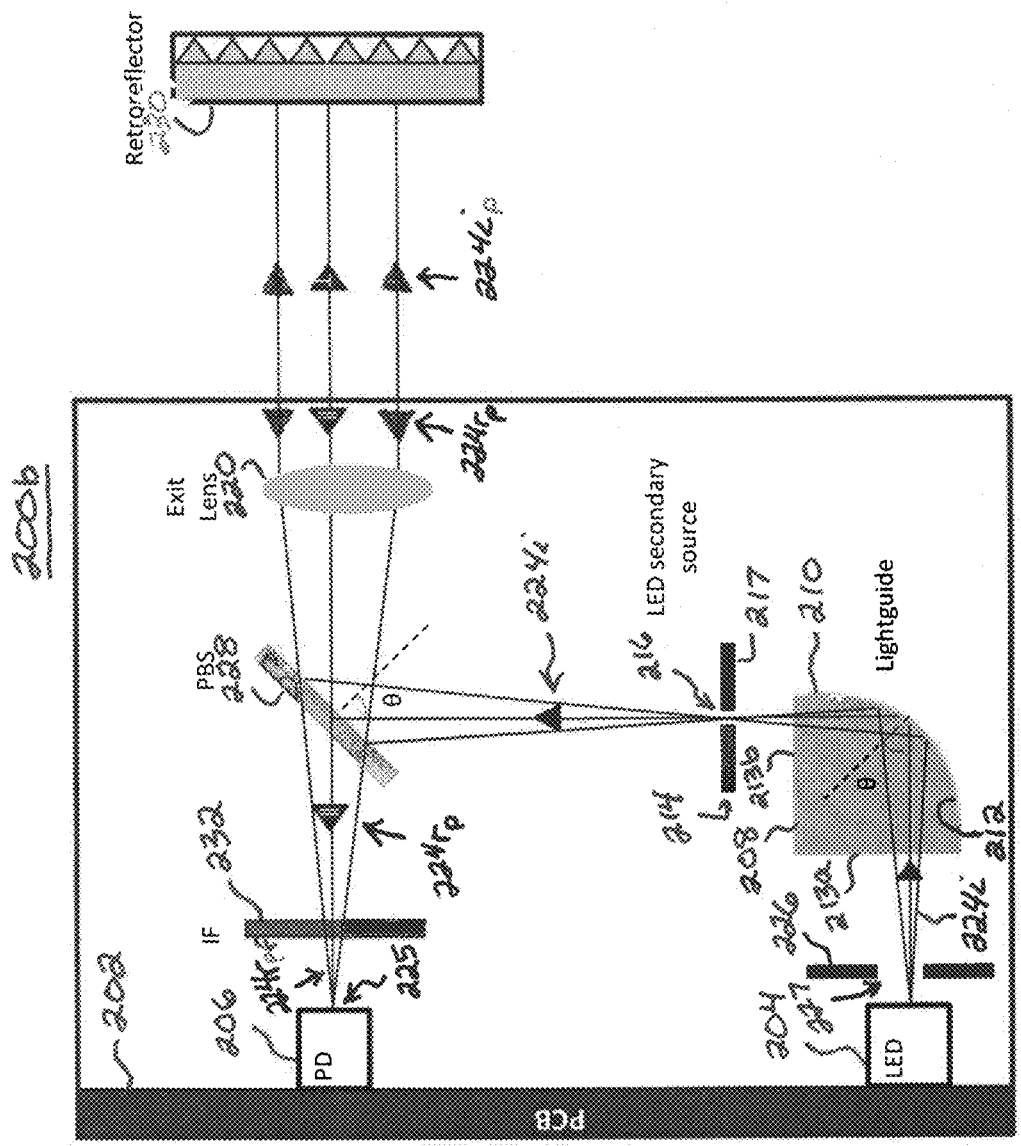
FIG. 2B is an illustration of an alternative illustrative coaxial photoelectric sensor.

With regard to FIG. 2B, an illustration of an alternative illustrative coaxial photoelectric sensor 200b is shown. The sensor 200b includes many of the same optical components as the coaxial photoelectric sensor 200a, but includes additional components and alternative components to support additional functions and features. The sensor 200b is shown to include a structure 226 that defining an opening 227 through which the incident illumination signal 224i passes. In an embodiment, the opening 227 is an iris, optionally dynamically adjustable, that may be shaped, as desired, and may prevent spurious illumination signals from entering the sensor 200b. The opening 227 may be circular or any other shape.

Reflective optical components may be a polarizing beam splitter 228 and retroreflector 230. In operation, the polarizing beam splitter 228 may filter the incident optical signal 224i so as to generate a polarizing incident optical signal $224i_p$, and the retroreflector 230 may be configured to rotate the polarized incident illumination signal $224i_p$ that is collimated by the exit lens 220 by 90 degrees to produce a reflected polarized illumination signal $224r_p$. Thereafter, an inferential or bandpass filter 232 may be configured to filter the reflected polarized illumination signal $224r_p$ to produce a filtered reflected polarized illumination signal $224r_{pf}$ prior to the signal $224r_p$ illuminating the optical receiver 206. By including the bandpass filter 232, ambient or other light that is received by the sensor 200b may be reduced or eliminated, thereby improving operation of the sensor 200b.

With regard to FIG. 3A, for comparison purposes, an illustration of an illustrative unsuitable portion of an optical configuration 300a for use in an optical sensor is shown. In this embodiment, an optical emitter 302 is shown to be in optical communication with a prism-like light guide 302.

The prism-like light guide 304 includes a straight wall 306 with an inside surface 308 that may reflect optical signals. The prism-like light guide 304 includes a first sidewall 309a and a second sidewall 309b through which incident optical signals 310a, 310b, and 310c (collectively 310) are shown to pass. In this case, however, the incident optical signals 310a and 310c that impinge the second surface 308 at incidence angles α and β are lost as a result of not being directed to the reflective optical element 218 (see FIG. 2). And while incident angles θ (or α and β) may provide for an angle that may be used within an optical path, as a result of each of the incident angles θ, α, and β being different, the use of a prism with a second surface 308 that is flat generally precludes the use of such an optical element. Furthermore, a prism with a flat reflection surface lengthens the optical path of the incident optical signal 310 with respect to the reflected optical signal (not shown) making it impossible to use a common exit lens to collimate both the incident optical signal and reflected optical signal.

With regard to FIG. 3B, an illustration of an optical configuration 300b that includes a total internal reflection optical component or curved light guide 310 similar to or identical to the TIR optical component 208 of FIG. 2 is shown. The TIR optical component 310 includes a curved profile 312 that provides a second sidewall 314b that enables every point to an incidence angle θ that is greater than the critical angle that maximizes the reflected energy of an incident optical signals 316a-316c (collectively 316). The curved profile 312 may be elliptical or parabolic, for example. As shown, the incident optical signals 316 enter the TIR optical component 310 via a first sidewall 314a and exits via a third sidewall 314c. As a result of each of the incident optical signals 316 being incident on the curved second sidewall 314b with an incidence angle θ, each of the incident optical signals 316 is reflected to a common focal point 318 that effectively becomes an LED virtual image on a focal plane 320. The use of a curved light guide 310 allows tuning of the optical features, such as optical power and spot size outside the exit lens (see FIGS. 2A and 2B).

Figure 4A:
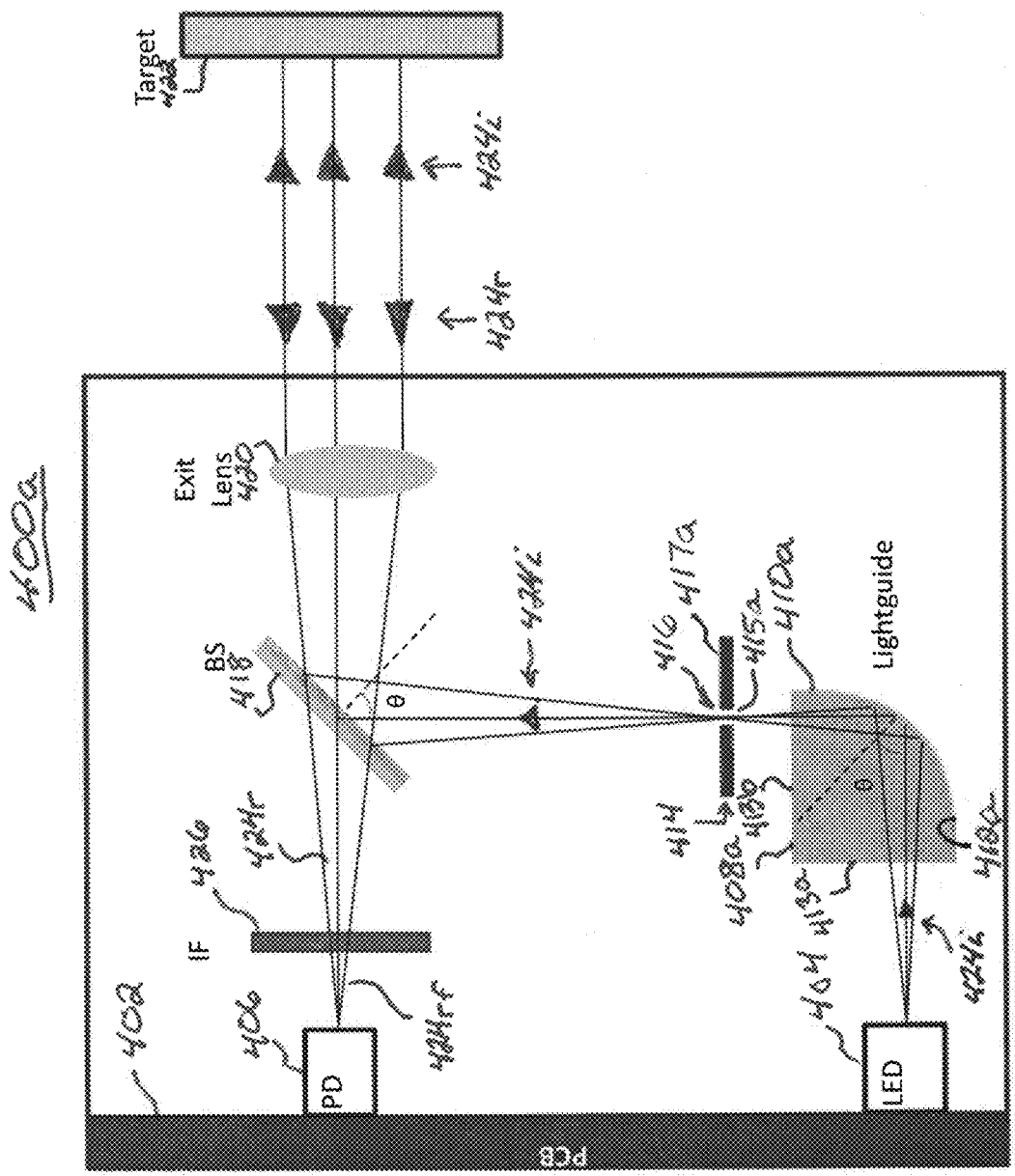
FIG. 4A is an illustration of an alternative coaxial photoelectric sensor.

With regard to FIG. 4A, an illustration of an alternative coaxial photoelectric sensor 400a is shown. The sensor 400a includes many of the same optical components as previously presented reflective photoelectric sensors, but includes additional components and alternative components to support additional and/or alternative functions and features.

The sensor 400a may include a printed circuit board (PCB) 402 that includes an optical emitter 404 and an optical detector or receiver 406. By mounting the optical emitter 404 and optical detector 406 to the PCB 402, the optical emitter 404 and optical receiver 406 are coplanar and additional positioning hardware and manufacturing processes to install the positioning hardware and align an emitter and receiver are eliminated, thereby reducing cost and complexity of the sensor 400a. The optical emitter 404 may be a photodiode or laser, for example.

A total internal reflection optical component or lens 408a may be optically aligned with the optical emitter 404. The TIR optical component 408a may be a lens that includes a curved profile 410a having an elliptical shape with a second surface or internal curved surface 412a that reflects incident light beams received via a first surface or incident sidewall 413a and exits via a third surface or exit sidewall 413b. In an embodiment, the TIR optical component 408a may be configured with a focal plane 414 at which the elliptically shaped curved profile 410a causes a focal point 416 to be formed, thereby operating as a virtual source (i.e., a spot in space from which illumination signals appear to emanate).

As shown, the virtual source is perpendicular or 90° with respect to an axis of the receiver 406. In an embodiment, the focal plane 414 may include a structure 417a defined by an iris or an opening 415a within which the focal point 416 is formed. The opening 415a may be circular or any other shape and have first dimensions. In an embodiment, the focal point 416 may be larger than the opening of the structure 417a, thereby shaping the virtual light source. Additionally, the structure 417a may operate to eliminate spurious illumination signals that might otherwise pass from the TIR optical component 408a directly or indirectly to the receiver 406.

The reflective optical component 418 may be a partially reflecting mirror, a polarizing beam splitter, a polarizing bandpass filter, or a mirror with a hole, as further provided herein with regard to FIGS. 5A-5C. The reflective optical component 418 may be any other optical component that performs the same or similar function of the reflective optical component 418, as further described herein.

In an embodiment, an exit lens 420 may be provided at an output port of the sensor 400a, and be configured to collimate an optical signal so as to be perpendicularly output from the sensor 400a. A target reflector optical component 422 may be optically aligned with the reflective optical component 418 so as to coaxially reflect an illumination signal received from the reflective optical component 418.

The optical detector 406 disposed on the PCB 402 may be configured to generate an electrical signal in response to receiving an illumination signal. The optical detector 406 may be a single element or include multiple detector elements (e.g., 1D array or 2D matrix). In an embodiment, the optical detector 406 may be a photodiode, a position sensitive device, an avalanche photodiode, or a photodiode array. In an embodiment, the optical path from the exit lens 420 to the optical detector 406 has the same length as the optical path from the focal point 416 of the virtual source to the exit lens 420, thereby minimizing optical components positioning hardware.

As shown, an inferential or bandpass filter 426 may be configured to filter the reflected illumination signal $424r_p$ to generate a filtered reflected illumination signal $424r_{pf}$ prior to the signal $424r_p$ illuminating the optical receiver 406. By including the bandpass filter 426, ambient or other light that is received by the sensor 400b may be reduced or eliminated, thereby improving operation of the sensor 400b.

Figure 4B:
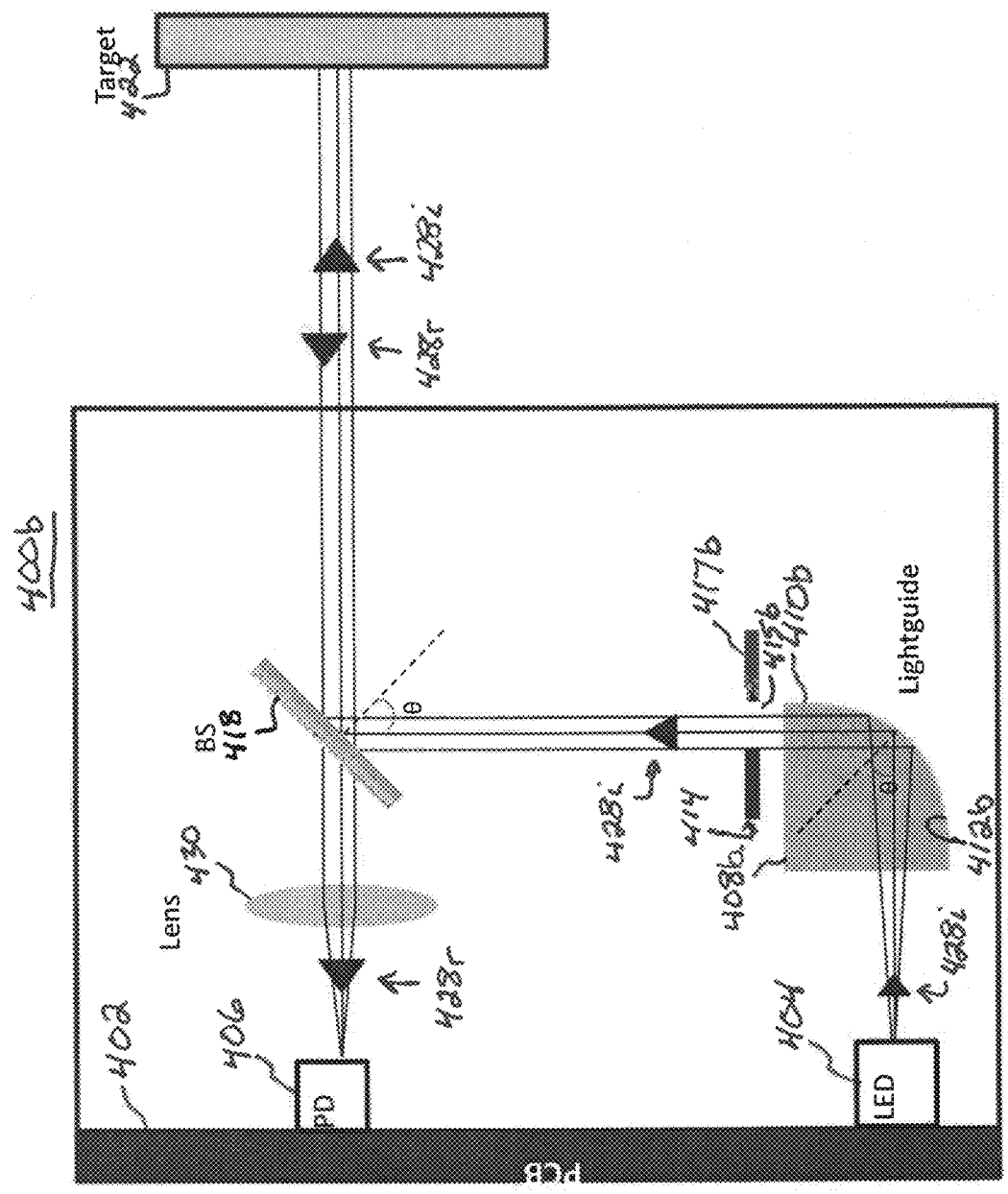
FIG. 4B is an illustration of an alternative coaxial photoelectric sensor.

With regard to FIG. 4B, an illustration of an alternative coaxial photoelectric sensor 400b is shown. In this embodiment, a TIR optical component 408b has a curved profile 410b with a parabolic shape that causes incident illumination signals 428i to reflect in a parallel manner from an internal curved surface 412b as opposed to having a focal point 416 of FIG. 4A. To enable the parallel illumination signals 428i, a structure 417b may define a wider opening 415b than the opening 415a of the structure 417a. As a result of the incident illumination signals 418i being reflected in parallel from the TIR optical component 408b, an exit lens to collimate the optical signals 428i is not used. However, to focus reflected optical signals 428r onto the optical receiver 406, a lens 430 may be disposed prior to the optical receiver 406. It should be understood that the configuration of the sensors 400a and 400b are illustrative and that alternative optical configurations may be utilized to perform the same or similar functions.

To reduce or avoid energy losses, the incident illumination signals 424i and 428i should be perpendicular to the incident and exit sidewalls 413a and 413b. It should be understood that the same result may be achieved using a curved mirror (e.g., with an elliptical shape) instead of using a TIR optical component 408b. As understood, however, metallization of a curved surface is a more expensive process than plastic lens manufacturing so a TIR optical component formed of plastic or other non-metalized material with a curved surface may be used for reduced cost. However, despite the added cost, such a configuration is possible, as provided in FIG. 4C.

Figure 4C:
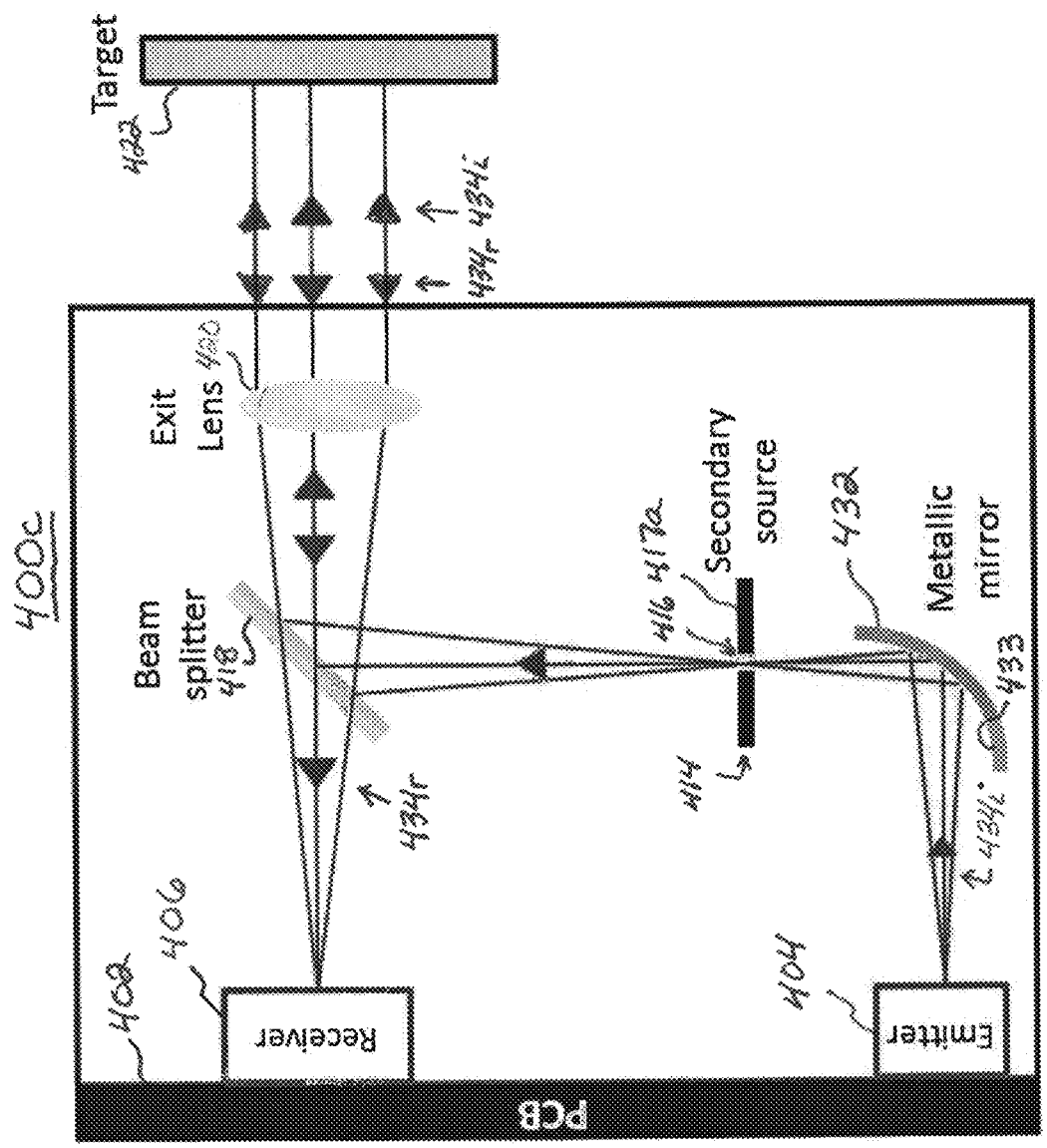
FIGS. 4C and 4D are illustrations of additional alternative coaxial photoelectric sensors.

With regard to FIG. 4C, an illustration of another alternative coaxial photoelectric sensor 400c is shown. The sensor 400c includes the PCB 402 with the emitter 404 and receiver 406 disposed on one side thereon. Rather than using either of the TIR optical components 408a or 408b, a metallic mirror 432 may be utilized. The metallic mirror 432 may have a reflective surface 433 from which an incident optical signal 434i is reflected. The metallic mirror 432 may be curved profile, such as an elliptically shaped profile, that results in the virtual secondary light source at the focal point 416, as previously described.

Figure 4D:
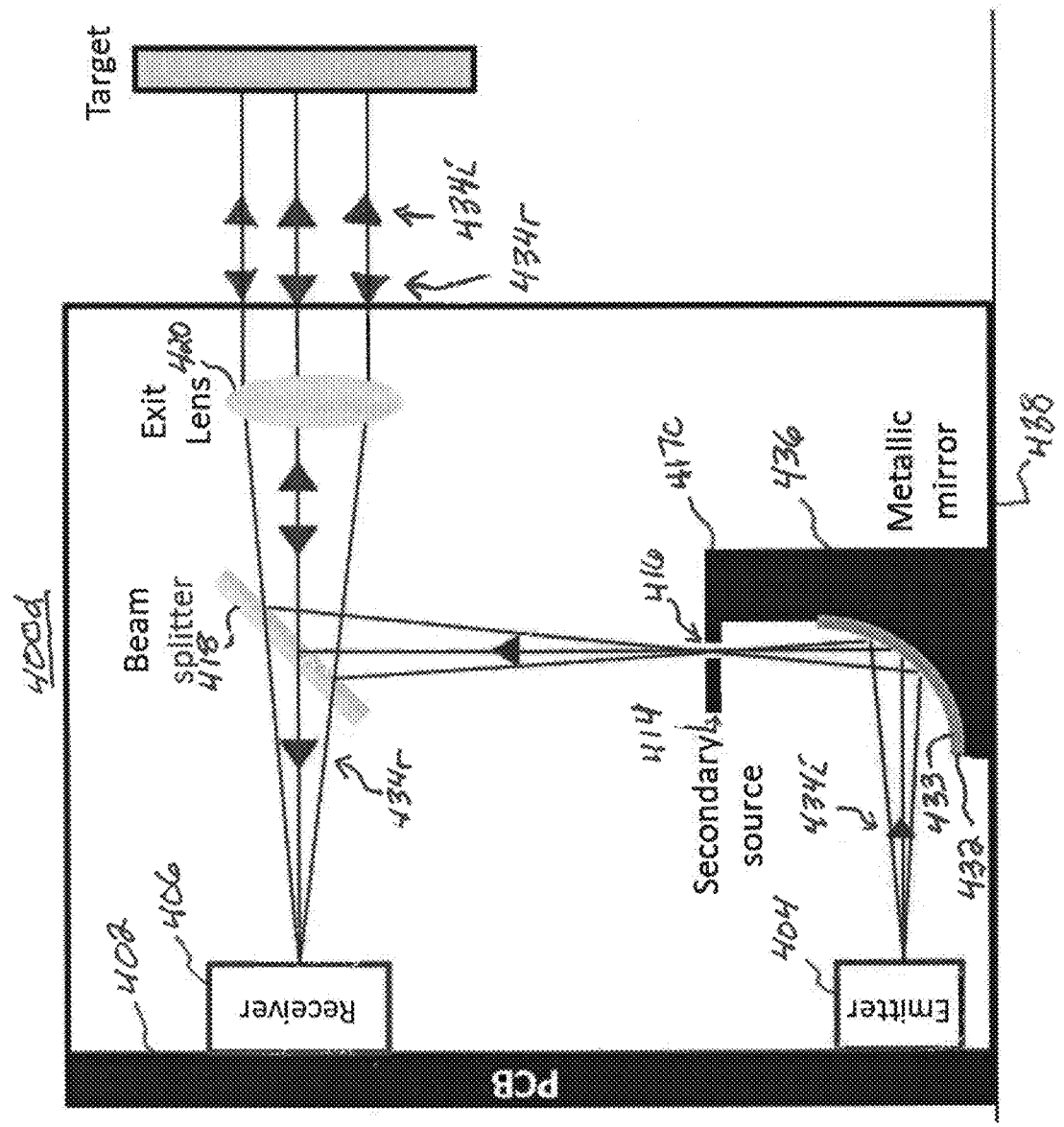

With regard to FIG. 4D, an illustration of another alternative coaxial photoelectric sensor 400d is shown. The sensor 400d is the same as the sensor 400c with the exception that a base structure 436 to which the metallic mirror 432 is attached, and that may define a structure 417c or have the structure 417c attached thereto to enable the incident optical signal 434i to form a virtual secondary light source at the focal point 416. The use of the base structure 436 may simplify assembly of the sensor 400d as the base structure may be mounted to a housing 438 of the sensor.

With regard to FIGS. 5A-5C, illustrations of alternative configurations of optical components 500a-500c of a coaxial photoelectric sensor are shown. FIG. 5A includes a first polarizer optical component 502, mirror 504 with an opening 505, and second polarizer optical component 506. As understood in the art, the first polarizer optical component 502 may be configured to polarize an incident optical signal 508i to produce a polarized incident optical signal 508b so as to enable optical signals with a certain polarization and reduce or eliminate optical signals not in that polarization. For example, vertically polarized optical signals pass through the first polarizer optical component 502 and non-vertically polarized optical signals are reduced or eliminated from passing through the component 502.

A reflected optical signal 508r may reflect from a reflective target optical component and pass through the opening 505 defined by the mirror 504. The opening 505, of course, is sided and shaped to enable the reflected optical signal 508r to pass and optionally be shaped by the opening 505. As shown, the reflected optical signal 508r is offset sufficiently so as to pass through the opening 505. The reflected optical signal 508r may thereafter be filtered by the second polarizer optical component 506 so as to produce a polarized reflected optical signal $508r_p$ that filters out ambient optical signals and/or any optical signals of the reflected optical signal 508r not aligned with the polarization of the second polarizer optical component 506. The polarized reflected optical signal $508r_p$ may thereafter be applied to an optical detector (see FIGS. 4A and 4B), as previously described.

As provided in FIG. 5B, rather than using a mirror 504 with an opening 505, a beam splitter 510 is used to reflect the polarized incident optical signal $508i_p$ and also pass the polarized reflected optical signal $508r_p$. This configuration of optical components 500b provides for the same polarization processing of the incident and reflected optical signals $508i_p$ and $508r_p$ as the configuration of optical components 500a.

As provided in FIG. 5C, the configuration of optical components 500c provides for eliminating the first and second polarized optical components 502 and 506 used in FIGS. 5A and 5B, and uses a polarizing beam splitter (or polarizing bandpass filter) 512 to reflect a certain polarization so that a polarized incident optical signal $508i_p$ results and a polarized reflected optical signal $508r_p$ is received after reflection. As understood in the art, the polarizing beam splitter 512 reflects one of the s- or p-polarization electric fields and transmits the other. The polarized reflected optical signal $508r_p$ passes through the polarizing beam splitter 512. As understood in the art, the polarized reflected optical signal $508r_p$ is polarized in an opposite manner due to being reflected by a retroreflector, which enables the polarized reflected optical signal $508r_p$ to pass through the filter (see FIG. 4A) with minimal loss prior to impinging the optical sensor (see FIG. 4A). The configuration of optical components 500c minimizes the number of optical components, which may also allow for the least number of assembly components and steps for manufacturing a coaxial photoelectric sensor.

Figure 6:
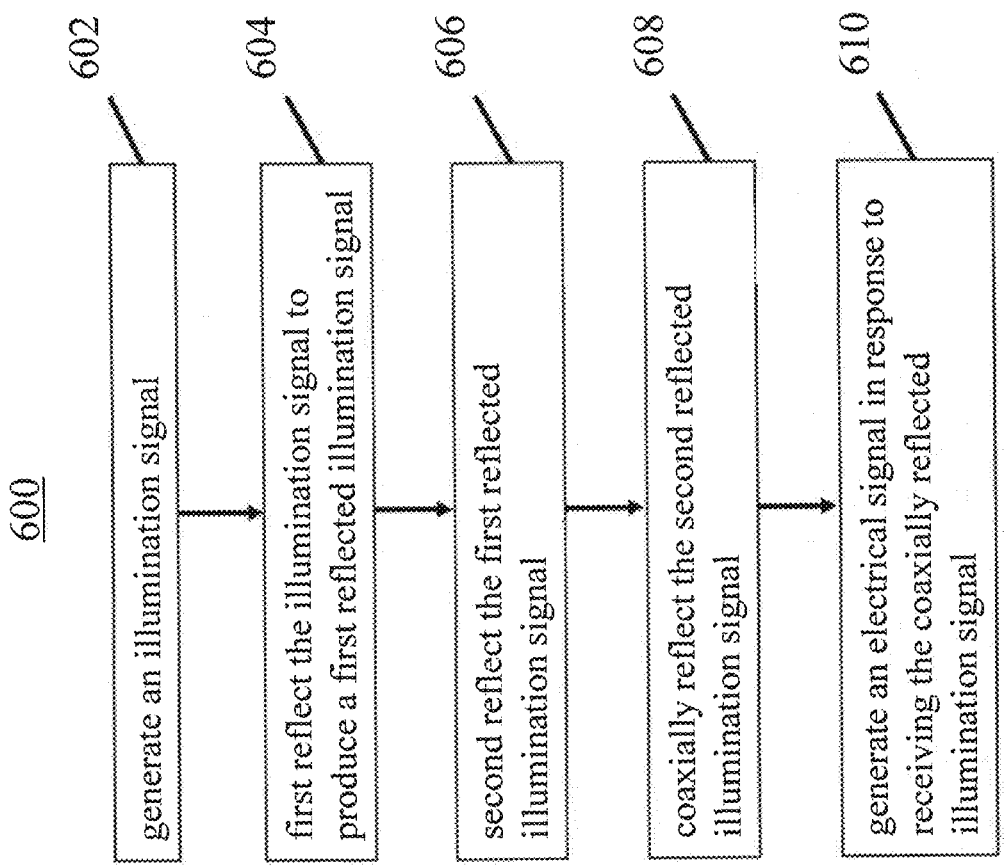
FIG. 6 is a flow diagram of an illustrative process for coaxially photoelectrically sensing.

With regard to FIG. 6, a flow diagram of an illustrative process 600 for coaxially photoelectrically sensing by a coaxial photoelectric sensor is shown. The coaxial photoelectric sensing process 600 may start at step 602, where an incident illumination signal is generated. The incident illumination signal may be produced by an LED or laser. The illumination signal may be first reflected, such as totally internally reflecting, so as to cause the incident illumination signal to be a first reflected illumination signal and routed along an optical path by 90 degrees at step 604. It should be understood that alternative angles may be utilized depending on the configuration of the sensor. At step 606, the first reflected illumination signal may be second reflected to produce a second reflected illumination signal. The reflection may be performed by a number of different types of reflective optical components, such as a mirror that defines an opening through with a coaxial reflection may traverse, a beam splitter, a polarizing beam splitter, or otherwise.

At step 608, the second reflected illumination signal may be coaxially reflected. The coaxial reflection may be performed by a reflective optical component, such as a target optical component, retroreflector, or otherwise. The coaxial reflection enables the sensor to sense a transparent object passed between an exit port of the sensor (i.e., after the reflective optical component) and the target reflective optical component optically aligned to coaxially reflect the incident illumination signal. At step 610, an electrical signal may be generated in response to receiving the coaxially reflected illumination signal. The electrical signal may be generated by an optical detector, such as a photodiode or other photoelectric device, as previously described herein. In an embodiment, a lens may be utilized to both collimate the incident illumination signal and focus the coaxially reflected illumination signal onto the optical detector.

In an embodiment, first reflecting the illumination signal includes totally internally reflecting the illumination signal optionally using a light guide. In an embodiment, coaxially reflecting the second reflected illumination signal includes reflecting the second reflected illumination signal using a retroreflector. First reflecting the illumination signal may include causing the illumination signal to be focused at a focal plane to produce a virtual secondary illumination source. Second reflecting the first reflected illumination signal may include reflecting the first reflected illumination signal using a beam splitter. In an embodiment, using a beam splitter may include using a polarizing beam splitter.

In an embodiment, coaxially reflecting the totally internally reflected illumination signal may include retroreflecting the second reflected illumination signal to cause polarization of the illumination signal to be rotated by 90°. The process 600 may further include interference filtering the coaxially reflected illumination signal. The process 600 may further include collimating the reflected totally internally reflected illumination signal.

Figure 7:
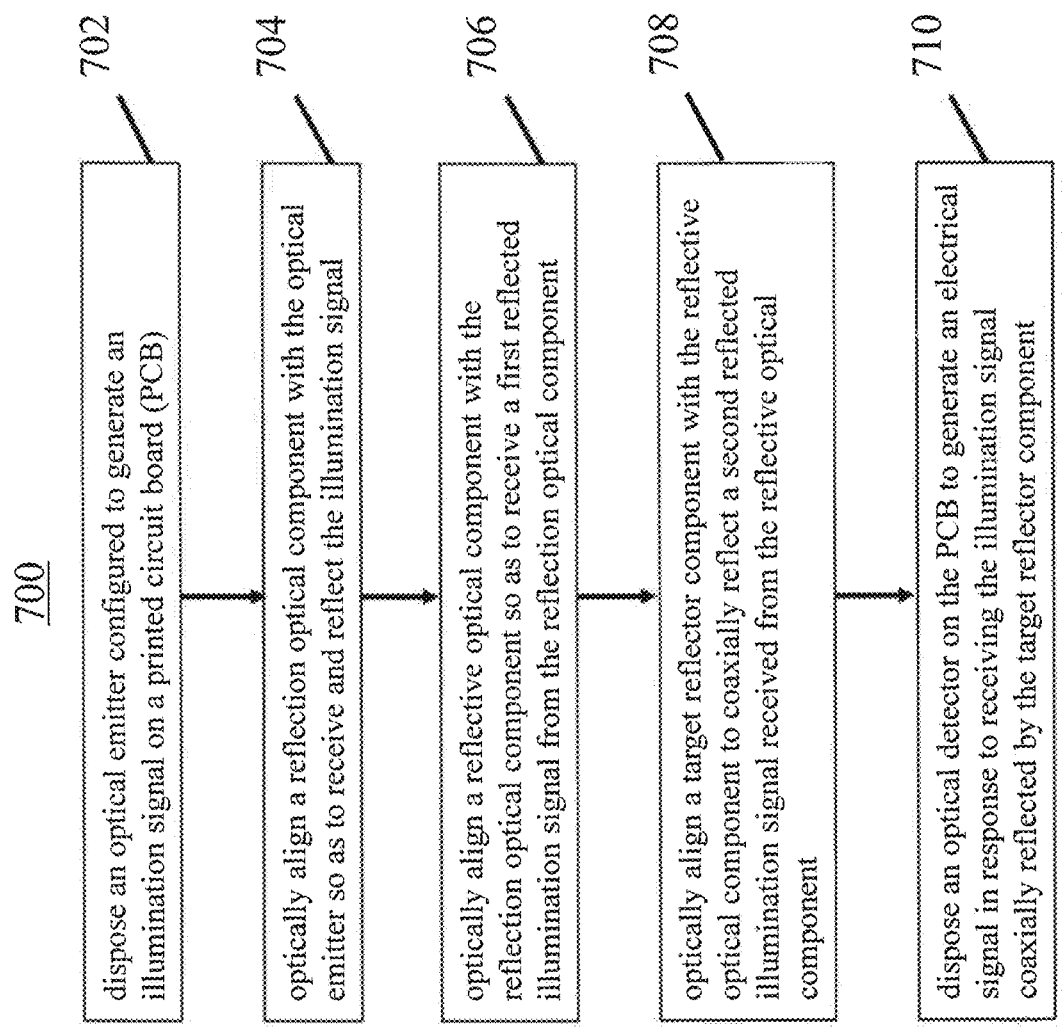
FIG. 7 is a flow diagram of a process of manufacturing a coaxial photoelectric sensor.

With regard to FIG. 7, a flow diagram of a manufacturing process 700 of a coaxial photoelectric sensor is shown. The process 700 may start at step 702, where an optical emitter may be disposed on a printed circuit board (PCB). The optical emitter may be configured to generate an illumination signal. At step 704, a reflection optical component may be optically aligned with the optical emitter to receive and reflect the illumination signal to produce a first reflected illumination signal. A reflective optical component may be optically aligned with the reflection optical component so as to receive the first reflected illumination signal received from the reflection optical component at step 706 and produce a second reflected illumination signal. At step 708, a target reflector component may be optically aligned with the reflective optical component to coaxially reflect the second illumination signal received from the reflective optical component. At step 710, an optical detector may be disposed on the PCB to generate an electrical signal in response to receiving the illumination signal coaxially reflected by the target reflector component.

Various features of the coaxial photoelectric sensor and process thereof may exist. For example, an aperture may be placed or positioned at the exit of an LED window or on an LED virtual image plane after the TIR lens. Both of the configurations enable tuning of a size of a light spot by shrinking or enlarging a diaphragm aperture, but just the latter configuration allows the definition of a more precise spot filtered from optical aberrations, multiple reflections inside the TIR lens, and deformations due to unavoidable mold imperfections. The diaphragm may be manufactured with an external metallic or plastic foil or may be integrated in the design of an optical camera or may be directly realized on a third or exit surface of the TIR lens (e.g., with pad printing or painting using a mask or other technologies).

As provided herein, the configuration of the photoelectric sensors may create a virtual source oriented 90° with respect to a receive axis (i.e., axis of the optical detector), but both of the photoelements may be positioned on the same side of a PCB. As such, a total number of PCBs may be saved, and an optics function of the sensor can be specialized in early stages of production, thereby making the production flow more uniform. In an embodiment, the shape of the sensed optical signal or light spot, which is controlled by the shape of the virtual light source, may be performed by varying an iris aperture with different geometries so as to realize the same optical function as conventional coaxial sensors, but using fewer opto-mechanical parts than conventional coaxial sensors. As a result, a reduction of opto-mechanical complexity and labor cost is also reduced. The reduction of opto-mechanical complexity also improves simplicity of assembly and ruggedness of the sensor. Moreover, having a wide range of possible reflecting optical elements maximizes output performance and allows better tunability of the output features, such as optical power and spot size. Additionally, the wide range of possible main reflecting optical components may allow for reducing or minimizing energy loss.

The coaxial photoelectric sensor features described herein may be utilized in non-polarized and polarized coaxial photoelectric sensors for the detection of transparent, opaque, and/or reflective targets. Moreover with respect to coaxial systems, a single light spot may be illuminated onto an optical sensor, and, therefore, a PSD or a photodiode array may be used as a detector, which may be useful because a new range of potential applications as a result of the detection of tilt of a target may be sensed. As a result of the simplicity of the optical component design provided herein, cost may be reduced. Moreover, the use of a virtual light source, as provided herein, provides a more uniform and well-defined light spot that is useful for customer applications.

The previous description is of a preferred embodiment for implementing the invention, and the scope of the invention should not necessarily be limited by this description. The scope of the present invention is instead defined by the following claims.

What is claimed is:

1. A coaxial photoelectric sensor, comprising:
   an optical emitter disposed on a printed circuit board (PCB), and configured to generate an illumination signal;
   a reflection optical component optically aligned with the optical emitter to receive and reflect the illumination signal to generate a first reflected illumination signal;
   a reflective optical component optically aligned with the reflection optical component so as to reflect the first reflected illumination signal received from the reflection optical component to produce a second reflected illumination signal, the reflection optical component being configured to cause the first reflected illumination signal to be focused at a focal plane between the reflection optical component and the reflective optical component, thereby producing a virtual secondary illumination source at the focal plane;
   a target reflector component optically aligned with the reflective optical component to coaxially reflect the second reflected illumination signal received from the reflective optical component; and
   an optical detector disposed on the PCB, and configured to generate an electrical signal in response to receiving the illumination signal coaxially reflected by the target reflector component.

2. The sensor according to claim 1, further comprising an exit lens, and wherein (i) a length of an optical path between the exit lens and the optical detector and (ii) a length of the optical path between the exit lens and the virtual secondary illumination source are approximately the same.

3. The sensor according to claim 1, wherein the reflection optical component is a total internal reflection optical component.

4. The sensor according to claim 1, wherein the reflection optical component is a curved mirror.

5. The sensor according to claim 1, wherein the target reflector component is a retroreflector.

6. The sensor according to claim 1, wherein the target reflector component is an object being inspected.

7. The sensor according to claim 1, further comprising an interference filter optically aligned between the reflective optical component and optical detector.

8. The sensor according to claim 1, further comprising a collimating lens disposed between the reflective optical component and the target reflector component.

9. The sensor according to claim 1, further comprising an iris disposed at a focal plane of the reflection optical component.

10. The sensor according to claim 1, wherein the virtual secondary illumination source is perpendicular with respect to an axis of the optical detector.

11. The sensor according to claim 1, wherein the reflection optical component includes at least one of a partially reflecting mirror, a polarizing mirror, a polarizing beam splitter, a polarizing bandpass filter, or a mirror with a hole.

12. A method of coaxially photoelectric sensing, comprising:
generating an illumination signal;
first reflecting the illumination signal to produce a first reflected illumination signal;
second reflecting the first reflected illumination signal to produce a second reflected illumination signal, wherein first reflecting includes focusing the first reflected illumination signal at a focal plane prior to second reflecting the first reflected illumination signal, thereby producing a virtual secondary illumination source at the focal plane;
coaxially reflecting the second reflected illumination signal; and
generating an electrical signal in response to receiving the coaxially reflected illumination signal.

13. The method according to claim 12, further comprising collimating the second reflected illumination signal prior to coaxially reflecting the second reflected illumination signal, and wherein a length of an optical path between a plane at which the collimating occurs and a plane at which the coaxially reflected illumination signal is received is substantially the same as a length of an optical path between the plane at which the collimating occurs and focal plane.

14. The method according to claim 12, wherein first reflecting the illumination signal includes totally internally reflecting the illumination signal.

15. The method according to claim 12, wherein first reflecting the illumination signal includes first reflecting the illumination signal using a curved mirror.

16. The method according to claim 12, wherein coaxially reflecting the second reflected illumination signal includes retroreflecting the second reflected illumination signal.

17. The method according to claim 12, wherein coaxially reflecting the second reflected illumination signal includes coaxially reflecting the second reflected illumination signal by an object being inspected.

18. The method according to claim 12, further comprising interference filtering the coaxially reflected illumination signal.

19. The method according to claim 12, further comprising collimating the second reflected illumination signal.

20. A method of manufacturing a coaxial photoelectric sensor, comprising:
disposing an optical emitter on a printed circuit board (PCB), the optical emitter being configured to generate an illumination signal;
optically aligning a reflection optical component with the optical emitter to receive and reflect the illumination signal to produce a first reflected illumination signal;
optically aligning a reflective optical component with the reflection optical component so as to receive the illumination signal received from the reflection optical component to produce a second reflected illumination signal;
optically aligning a target reflector component with the reflective optical component to coaxially reflect the second reflected illumination signal received from the reflective optical component;
disposing an optical detector on the PCB to generate an electrical signal in response to receiving the illumination signal coaxially reflected by the target reflector component; and
optically aligning an exit lens with the reflective optical component, wherein (i) a length of an optical path between the exit lens and the optical detector and (ii) a length of an optical path between the exit lens and a focal plane between the reflection optical component and the reflective optical component are approximately the same.

* * * * *